March 13, 1956  J. P. BRUCK  2,737,984
HAND MANIPULATED POWER OPERATED SABER SAW
Filed April 5, 1954  3 Sheets-Sheet 1
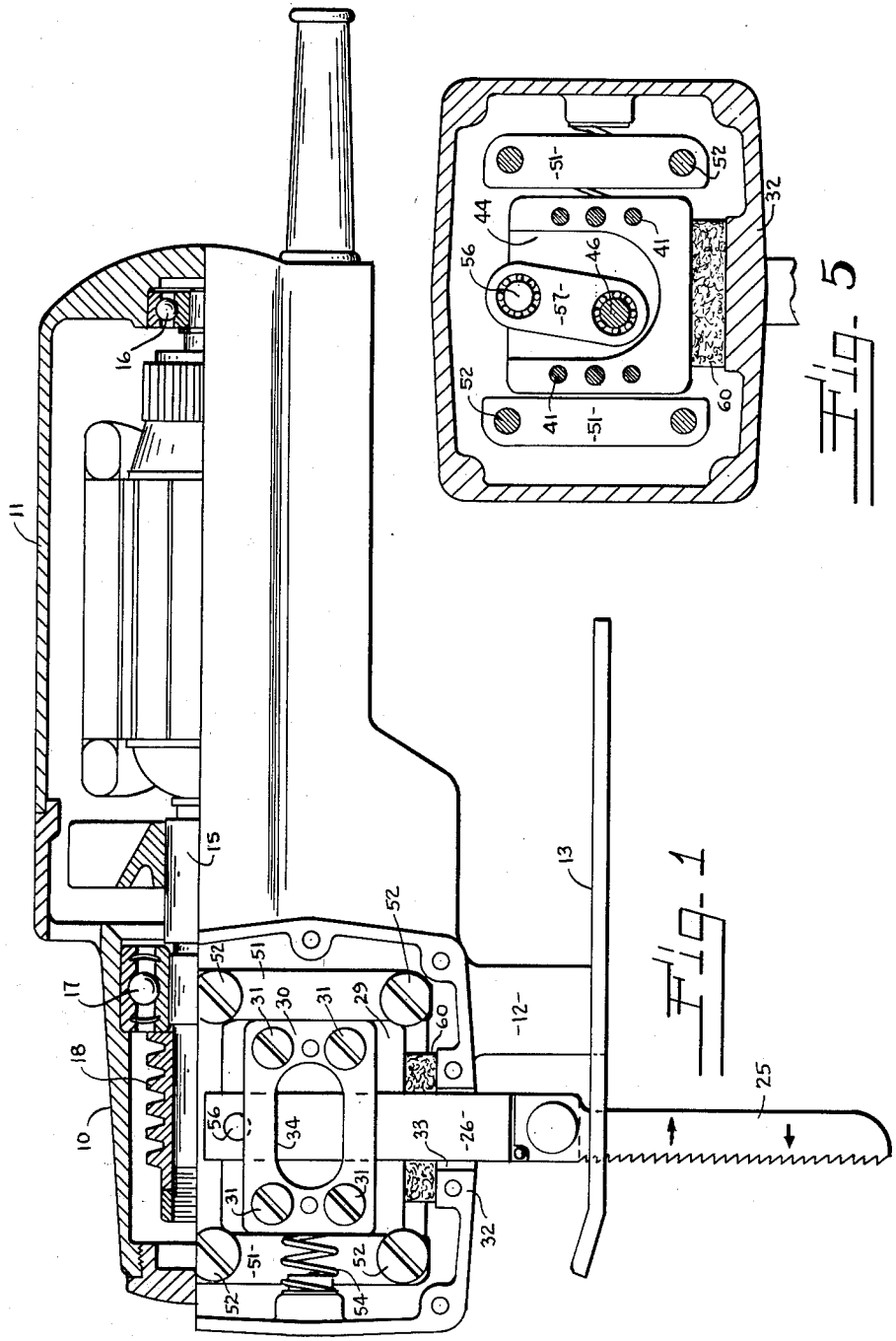
INVENTOR.
JOHN P. BRUCK
BY D. Emmett Thompson
Attorney

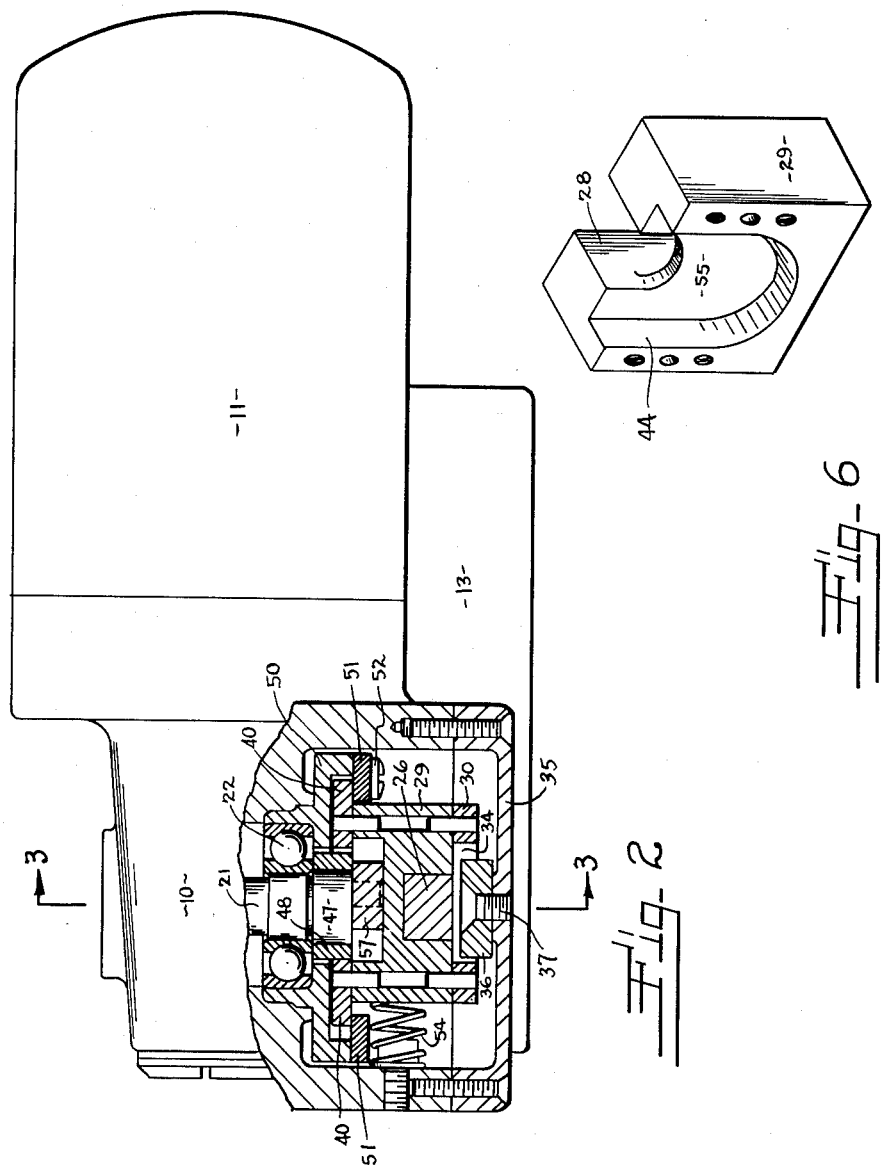

March 13, 1956   J. P. BRUCK   2,737,984
HAND MANIPULATED POWER OPERATED SABER SAW
Filed April 5, 1954   3 Sheets-Sheet 3
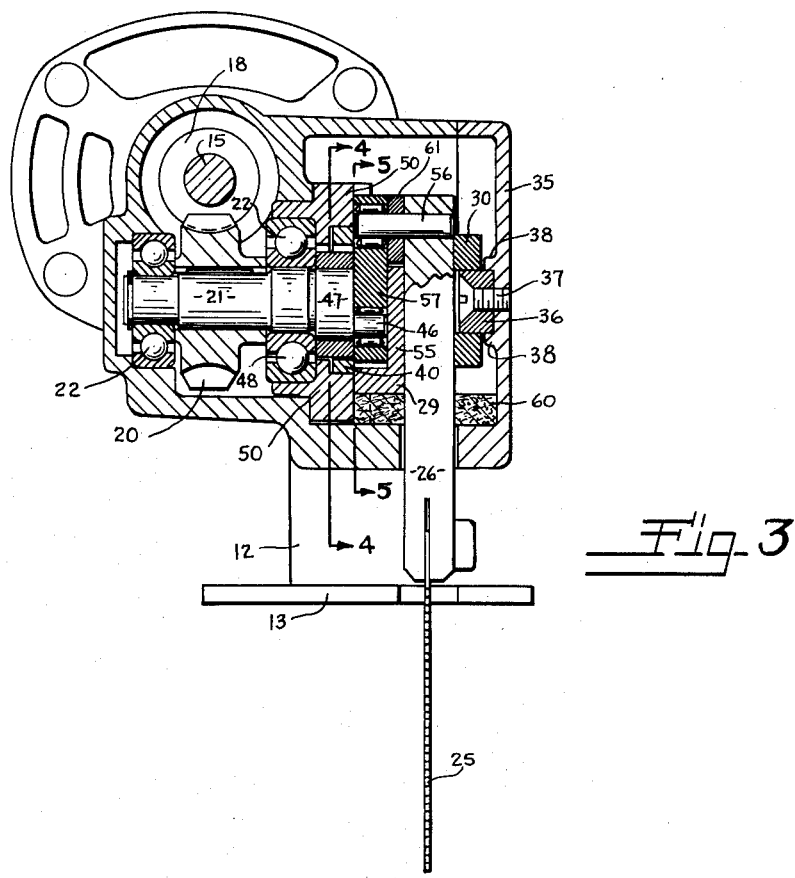
_Fig_3
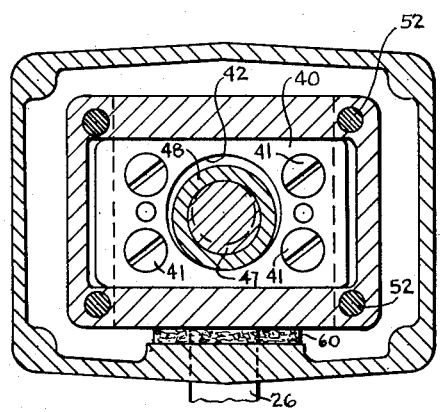
_Fig_4
INVENTOR.
JOHN P. BRUCK
BY D. Emmett Thompson
Attorney United States Patent Office 2,737,984
Patented Mar. 13, 1956

2,737,984

HAND MANIPULATED POWER OPERATED SABER SAW

John P. Bruck, Nedrow, N. Y., assignor to The Porter-Cable Machine Company, Syracuse, N. Y., a corporation of New York Application April 5, 1954, Serial No. 420,869

6 Claims. (Cl. 143—63)

This invention relates to power operated sawing devices and more particularly to a small, compact, bodily manipulable sawing device of the type employing a reciprocating saw blade. These devices are operated by a self-contained electric motor and are used for many sawing operations including the sawing of large panel boards and for making scroll cuts.

The invention has an object a sawing device of the type referred to embodying a structure operable to effect rapid, length-wise reciprocation of the saw blade, and simultaneously effect lateral movement of the saw blade in engagement with the work piece, upon movement of the saw blade in a direction perpendicular to the work, and moving the saw blade away from the work upon the reverse stroke of the blade. The structure is particularly compact and economical to manufacture, and operates at high speeds without objectionable vibration.

The invention consists of the novel features and in the combinations and constructions hereinafter claimed.

In describing this invention, reference is had to the accompanying drawings in which like characters designate corresponding parts in all the views.

Fig. 1 is a side elevational view with parts removed and parts in section.

Fig. 2 is a top plan view with parts broken away and parts in section.

Fig. 3 is a view taken on line 3—3 Fig. 2.

Fig. 4 is a view taken on line 4—4 Fig. 3.

Fig. 5 (Sheet 1) is a view taken on line 5—5 Fig. 3.

Fig. 6 (Sheet 2) is a perspective view of the blade holder supporting block.

The device consists of a housing formed by a forward casing 10 detachably secured to a rear casing 11 of approximately cylindrical formation. The forward casing 10 has a depending column 12 to which is secured a work engaging base plate 13, a motor is mounted in the casing 11 having its armature shaft 15 journaled in a bearing 16, mounted in the end wall of the cylindrical section 11, and a bearing 17 mounted in the forward section 10, the shaft extending forwardly into the casing 10. A worm gear 18 is fixedly secured to the extending portion of the shaft 15 and is arranged in mesh with a worm wheel 20 fixedly mounted on a shaft 21 extending perpendicular to the shaft 15 and being journaled in bearings 22 mounted in end section 10 of the housing, see Figs. 2 and 3.

The saw blade 25 is detachably mounted in the lower end of a blade holder 26, rectangular in cross section, and being slidably mounted for vertical movement in a slot 28, Figure 6, formed in a blade holder supporting block 29. The slot 28 extends perpendicular to the base plate 13, one side of this slot is open, and a plate 30 is detachably secured to the block 29 as by screws 31, Figure 1, the plate overlying the open side of the slot and serving to slidably retain the blade holder in the slot. The bottom wall 32 of the forward casing 10 is apertured as at 33 to permit the blade holder 26 to extend downwardly, externally towards the base plate 13.

The plate 30 is formed with an elongated aperture 34, see Figs. 1 and 2, and the removable side wall 35 of the housing section 10 is provided with a guide member 36 secured thereto as by a screw 37. The inner surface of the cover member 35 is formed with spaced shoulders 38 to correctly position the guide 36 and maintain it in proper alignment. This guide member extends into elongated aperture 34 of plate 30, the plate and the guide member forming means for guiding the block 29 for reciprocation in a direction parallel to the base plate 13 and perpendicular to the movement of the blade holder 26.

A second plate 40 is fixed to the opposite or inner side of the block 29 as by screws 41. This plate being formed with a circular aperture 42. The face of the block 29 to which the plate 40 is attached is recessed as at 44, the purpose of which will be hereinafter apparent. The shaft 21 extends through the plate 40 and is provided at its end with a crank pin 46, Figure 3. The portion of the shaft 21 extending through the plate 40 is formed with a cam portion 47 encircled by a collar 48, Figures 2 and 4, of anti-friction material, such as bronze, the collar being positioned in the aperture 42. The aperture 42 is slightly larger than the external diameter of the collar 48 to reduce the frictional contact between these two members. This device, in dimension, is exaggerated in the drawings for clarity.

The plate 40 is slidably mounted in a rectangular recess formed in the end of a retaining member 50 for one of the bearings 22. The plate 40 is somewhat longer than the width of the block 29, and the extending end portions of the plate 40 are overlaid by gibs 51 attached to the bearing retainer 50, as by screws 52, whereby the plate 40 is slidably retained in the bearing member 50. This arrangement in conjunction with the plate 30 and the guide member 36 forms means for slidably mounting the blade holder support 29 in the body of the device, and the collar 48 and the cam 47 effect horizontal reciprocation of the support member 29. Preferably the support member is yieldingly urged in one direction by a helical compression spring 54 interposed between the front wall of the forward casing 10 and the block 29, see Figs. 1 and 2. The spring 54 functions to maintain the plate 40 against the collar 48 on cam 47 and also serves to partially counter-balance the block.

The blade holder 26 is reciprocated in the block 29 by a crank mechanism. The upper portion of the wall 55 of the supporting block between the slot 28 and the recess 44 is formed with a notch, see Figs. 3 and 6, to receive a pin 56 fixedly mounted in the upper end of the blade holder 26. This pin extends through the notch in the wall 55 and a connecting rod 57 connects a crank pin 46 to the holder pin 56, the connecting rod 57 being positioned for operation in the recess 44. Anti-friction bearings of the needle type are employed in each end of the connecting rod for engagement with the crank pin 46 and the holder pin 56. With this arrangement, vertical reciprocation of the blade holder 26 is effected upon rotation of the shaft 21 and, of course, simultaneously the holder block 29 is reciprocated horizontally. The arrangement of the cam 47 and the crank pin 46 is such that as the blade 25 is moved upwardly, it is moved forwardly, see Fig. 1, into engagement with the material being sawed. As the blade 25 is moved downwardly, it is moved rearwardly away from the material. In other words, the teeth of the blade 25 move in a vertical ellipse.

The front casing 10 is formed oil-tight to retain lubrication for the moving parts and an oil retaining felt 60 is positioned on the bottom wall of the casing and encircles the blade holder 26, see Figs. 1 and 3, and a spacing washer 61 is positioned on the pin 56 between the upper end of the connecting rod and the upper end of the holder 26.

The casing 11 is held in the hand, and the device is thus guided with the base plate 13 resting upon the material being cut. The blades 25 are detachably secured to the blade holder, different types of blades may be used according to the material being cut, and the manner in which the cuts are being formed. The blade is reciprocated at high speed, the shaft 21 revolving at 3200–3500 R. P. M. With this high speed, the vertical stroke of the blade is relatively short, being in the nature of ½ inch, and the lateral movement of the blade is slight, in the nature of 3/32 of an inch. This high speed elliptical movement of the blade is most effective in sawing of all material capable of being cut with the device.

What I claim is:

1. A sawing device comprising an enclosed casing, a power operated shaft journaled in said casing and having a portion disposed within said casing, a saw blade holder support mounted within said casing, guide means cooperable with said support and with means interiorly of the casing for supporting and guiding said support for linear sliding movement only, a blade holder mounted in said support for linear sliding movement only in respect thereto and in a direction perpendicular to the sliding movement of said support, a saw blade fixedly secured to said holder and extending externally of the casing, and motion transmitting means within said casing connecting said shaft and blade holder to effect reciprocation of said holder in said support and being separately connected to said support to simultaneously and continuously effect reciprocation of said support.

2. A device as set forth in claim 1 wherein said motion transmitting means is in part within said blade holder support.

3. A device as set forth in claim 1 in which said blade holder support consists of a block having a guideway in which said blade holder is slidably maintained, and having a recess in which said motion transmitting means is in part located.

4. A sawing device as set forth in claim 1 wherein said blade holder support consists of a block having a guideway for said blade holder and having a recess in which said motion transmitting means is in part located, a plate detachably secured to said block and overlying said recess, said plate forming part of said guide means for said support.

5. A portable hand-manipulated saber saw comprising an enclosed case, a base plate carried by the casing and being adapted to be moved on the surface of the material to be cut, a power operated shaft journaled in said casing and having a portion disposed within the casing, a saw blade holder support maintained within the casing, guide means cooperable with said support and with means interiorly of the casing for supporting and guiding said support for linear sliding movement only in a direction parallel to said base plate, said support being formed with a guideway extending perpendicular to said base plate, a blade holder mounted in said last mentioned guideway for linear sliding movement only, motion transmitting means within said casing connecting said shaft and blade holder to effect reciprocation of said holder in said support and being separately connected to said support to simultaneously and continuously effect reciprocation of said support, and a saw blade fixedly secured to said holder and extending externally of the casing.

6. A sawing device comprising an enclosed casing, a power operated shaft journaled in said casing and having a portion disposed within said casing, a saw blade holder support mounted within said casing, guide means cooperable with said support and with means interiorly of the casing for supporting and guiding said support for linear sliding movement only, a blade holder mounted in said support for linear sliding movement only in respect thereto and in a direction perpendicular to the sliding movement of said support, a saw blade fixedly secured to said holder and extending externally of the casing, said support having a recess, a portion of said power shaft extending into said recess, a crank and connecting rod mechanism located within said recess and connecting said shaft and blade holder to effect reciprocation of the blade holder and said support, a cam mounted on said shaft in juxtaposition to said crank and connecting rod mechanism and operable upon rotation of said shaft to effect simultaneous and continuous reciprocation of said support.

References Cited in the file of this patent

UNITED STATES PATENTS

| | | |
|---|---|---|
| 272,630 | Berkshire | Feb. 20, 1883 |
| 1,014,500 | Martens | Jan. 9, 1912 |
| 1,165,298 | Vaughan | Dec. 21, 1915 |
| 2,175,499 | Wodack et al. | Oct. 10, 1939 |
| 2,337,769 | Redenbo | Dec. 28, 1943 |
| 2,639,737 | Forsberg | May 26, 1953 |

FOREIGN PATENTS

| | | |
|---|---|---|
| 542,143 | Germany | Jan. 20, 1932 |
| 585,297 | Great Britain | Feb. 4, 1947 |
| 1,032,269 | France | Mar. 25, 1953 |